United States Patent
Bhatia et al.

(10) Patent No.: US 11,261,119 B2
(45) Date of Patent: Mar. 1, 2022

(54) COLD-FORMABILITY OF GLASS LAMINATE ARTICLE UTILIZING STRESS PREDICTION ANALYSIS AND RELATED METHODS

(71) Applicant: CORNING INCORPORATED, Corning, NY (US)

(72) Inventors: Vikram Bhatia, Painted Post, NY (US); Ah-Young Park, Daejeon (KR); Yousef Kayed Qaroush, Painted Post, NY (US); Neng Wang, Wooster, OH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/753,972

(22) PCT Filed: Oct. 5, 2018

(86) PCT No.: PCT/US2018/054690
§ 371 (c)(1),
(2) Date: Apr. 6, 2020

(87) PCT Pub. No.: WO2019/071181
PCT Pub. Date: Apr. 11, 2019

(65) Prior Publication Data
US 2020/0239351 A1    Jul. 30, 2020

Related U.S. Application Data

(60) Provisional application No. 62/568,915, filed on Oct. 6, 2017.

(51) Int. Cl.
*C03B 23/023* (2006.01)
*B32B 17/10* (2006.01)
(Continued)

(52) U.S. Cl.
CPC .............. *C03B 23/023* (2013.01); *B32B 7/02* (2013.01); *B32B 17/10036* (2013.01);
(Continued)

(58) Field of Classification Search
CPC ................ B32B 7/02; B32B 17/10036; B32B 17/10119; B32B 17/10137;
(Continued)

(56) References Cited

U.S. PATENT DOCUMENTS 5,385,786 A    1/1995  Shetterly et al.
9,296,638 B2    3/2016  Lezzi et al.
(Continued)

FOREIGN PATENT DOCUMENTS

CA    2931916 A1    12/2016
EP    3038827 A2    7/2016
(Continued)

OTHER PUBLICATIONS

International Search Report and Written Opinion of the International Searching Authority; PCT/US2018/054690; dated Feb. 21, 2019; 10 Pages; European Patent Office.

*Primary Examiner* — David Sample
*Assistant Examiner* — Donald M Flores, Jr.
(74) *Attorney, Agent, or Firm* — Payal A. Patel; William M. Johnson

(57) ABSTRACT

Articles and methods related to the cold-forming of glass laminate articles utilizing stress prediction analysis are provided. A cold-forming estimator (CFE) value that is related to the stress experienced by a glass sheet of a glass laminate during cold-forming is calculated based on a plurality of geometric parameters of glass layer(s) of a glass laminate article. The calculated CFE value is compared to a cold-forming threshold related to the probability that defects are formed in the complexly curved glass laminate article during (Continued)

cold-forming. Cold-formed glass laminate articles are also provided having geometric parameters such that the CFE value is below the cold-forming threshold.

20 Claims, 9 Drawing Sheets

(51) Int. Cl.
*C03C 21/00* (2006.01)
*B32B 7/02* (2019.01)

(52) U.S. Cl.
CPC .. *B32B 17/10119* (2013.01); *B32B 17/10137* (2013.01); *B32B 17/10761* (2013.01); *C03C 21/002* (2013.01); *B32B 2250/03* (2013.01); *Y10T 428/24628* (2015.01); *Y10T 428/26* (2015.01)

(58) Field of Classification Search
CPC ........... B32B 17/10761; B32B 2250/03; Y10T 428/26; Y10T 428/24628
See application file for complete search history.

(56) References Cited

U.S. PATENT DOCUMENTS

| | | | |
|---|---|---|---|
| 9,931,817 | B2 | 4/2018 | Rickerl |
| 10,286,631 | B2 | 5/2019 | Alder et al. |
| 2012/0025559 | A1 | 2/2012 | Offermann et al. |
| 2016/0207290 | A1* | 7/2016 | Cleary .............. B32B 17/10761 |
| 2017/0008377 | A1* | 1/2017 | Fisher ................ B32B 17/1088 |
| 2017/0297308 | A1 | 10/2017 | Golyatin et al. |
| 2018/0304588 | A1 | 10/2018 | Harris et al. |

FOREIGN PATENT DOCUMENTS

| | | |
|---|---|---|
| WO | 94/17997 A1 | 8/1994 |
| WO | 2015/031594 A2 | 3/2015 |
| WO | 2015/084902 A1 | 6/2015 |
| WO | 2016/057590 A1 | 4/2016 |
| WO | 2017/019851 A1 | 2/2017 |
| WO | 2017/066243 A1 | 4/2017 |

* cited by examiner

COLD-FORMABILITY OF GLASS LAMINATE ARTICLE UTILIZING STRESS PREDICTION ANALYSIS AND RELATED METHODS

CROSS-REFERENCE TO RELATED APPLICATIONS

This application is a national stage application under 35 U.S.C. § 371 of International Application No. PCT/US2018/054690, filed on Oct. 5, 2018, which claims the benefit of priority under 35 U.S.C. § 119 of U.S. Provisional Application Ser. No. 62/568,915 filed on Oct. 6, 2017, the content of which is relied upon and incorporated herein by reference in its entirety.

BACKGROUND

The disclosure relates to cold-formed glass laminate articles, and more particularly to articles and methods related to the cold-forming of glass laminate articles utilizing stress prediction analysis. In specific embodiments, such articles may be used for vehicle applications, such as automotive glazing, and for architectural applications.

Curved laminates are used in a variety of applications including automotive glazing and architectural windows. For such applications, sheets of glass are precisely bent to defined shapes and/or curvatures determined by the configurations and sizes of the openings in which the glass will be mounted, as well as the vehicle style or architectural aesthetics. Such curved laminates may typically be made by heating flat glass sheets to a suitable temperature for forming, applying forces to the sheet to change the shape, then laminating two curved sheets together. This process is typically referred to as a "hot bending" process.

SUMMARY

A first aspect of this disclosure pertains to a method of estimating cold-formability of a complexly curved glass laminate article comprising a first glass sheet and a second glass sheet. The method includes obtaining a first geometric parameter (G1) and a second geometric parameter (G2) of a complexly curved first glass sheet of the glass laminate article. The method includes calculating a cold-forming estimator (CFE) value related to stress experienced by the first glass sheet during cold-forming. The CFE value includes $B1*G1+B2*G2$, where B1 and B2 are coefficients calculated to relate G1 and G2 to the CFE value. The method includes comparing the calculated CFE value to a cold-forming threshold related to the probability that defects are formed in the complexly curved glass laminate article during cold-forming.

A second aspect of this disclosure pertains to a method of cold-forming a complexly curved glass laminate article. The method includes supporting a first glass sheet, and the first sheet of glass material has a complexly curved shape, a first major surface and a second major surface. The method includes supporting a second glass sheet on the first glass sheet, and the second glass sheet has a first major surface, a second major surface and a shape that is different from the complexly curved shape. The method includes positioning a polymer interlayer material between the second major surface of the first glass sheet and a first major surface of the second glass sheet. The method includes bending the second sheet of glass material into conformity with the complexly curved shape of the first sheet of glass material. During bending, a maximum temperature of the first glass sheet is less than a glass transition temperature of a glass material of the first glass sheet, and a maximum temperature of the second glass sheet is less than a glass transition temperature of a glass material of the second glass sheet. The complexly curved shape has a first geometric parameter (G1) and a second geometric parameter (G2), and the first principle stress experienced by the first glass sheet during bending is less than or equal to an estimated stress value of $(B1*G1+B2*G2)$, wherein B1 and B2 are coefficients determined to relate G1 and G2 to the stress experienced by the first glass sheet during bending.

Another aspect of the disclosure pertains to a cold-formed glass laminate article. The glass laminate article includes a first glass layer and a second glass layer. The first glass layer includes an inner surface, an outer surface opposite the inner surface, a width, W, a length, L, and a complex curved shape having a chord height, CH, where $-0.14 < L/W - 0.05*(CH) < 0.223$. The second glass layer includes an inner surface and an outer surface. The glass laminate article includes a polymer interlayer disposed between the inner surface of the first glass layer and inner surface of the second glass layer.

Another aspect of the disclosure pertains to a cold-formed glass laminate article. The glass laminate article includes a first glass layer and a second glass layer. The first glass layer includes an inner surface, an outer surface opposite the inner surface, a width, W, a length, L, and an average thickness, T1. The first glass layer includes a complex curved shape having a chord height, CH, a depth of bend (DOB), a minimum primary radius of curvature, R1, a secondary minimum radius of curvature, R2, and a maximum Gaussian curvature, GC. The second glass layer includes an inner surface, an outer surface and an average thickness, T2. The glass laminate article includes an interlayer disposed between the inner surface of the first glass layer and inner surface of the second glass layer. The dimensions of the glass laminate article are such that $(0.05673*W-0.1035*L-0.0031*DOB+6.99003*CH+0.1855*R1+0.00115*R2+4.633988*GC-0.1836*T1-101.95*T2)$ is less than 80 MPa.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Referring generally to the figures, various methods related to cold-forming a complexly curved glass laminate article. In general, Applicant has determined that a stress (e.g., the first principle stress) experienced by one or more of the glass layers of a glass laminate during cold-bending is a good indicator of the likelihood of defect formation during cold bending. For example, Applicant has found that if the cold-bending stress experienced during cold-bending is too high, defects, such as edge wrinkling, or breakage can occur. However, standard processes, such as finite element analysis, to precisely calculate the stress that a glass laminate article will experience during cold bending are complicated and take substantial amounts of computing time and power.

As such, the present application relates to a process of determining cold-formability of glass laminate articles by calculating a cold-forming estimator (CFE) value that is related to the stress that glass sheet is expected to experience during cold-forming. The CFE value is then compared to a cold-forming threshold that is related to the probability that defects will be formed in the complexly curved glass laminate article during cold-forming. The CFE value is based on the sum of at least two geometric parameters indicative of the geometry of the glass laminate article that each are multiplied by statistically calculated coefficients. The cold-forming threshold may be determined via testing of different laminate structures to determine a threshold value that relates to a maximum acceptable stress that may be experienced by the glass laminate article during cold-bending without an undesired level defect formation.

Using the method discussed herein, once the CFE coefficients are determined and the cold-forming threshold is determined, defect formation during cold-forming can be accurately predicted simply by calculating the CFE value based on easy to measure geometric parameters of the glass laminate article. As such the method discussed herein eliminates the need for running complex mathematical analysis (e.g., finite element analysis) or prototyping/testing to determine whether a new complexly curved glass laminate article design may be cold-formed without unacceptable defect formation. Thus, in this manner the process of cold-forming new, complexly curved glass laminate articles may be streamlined.

Figure 1:
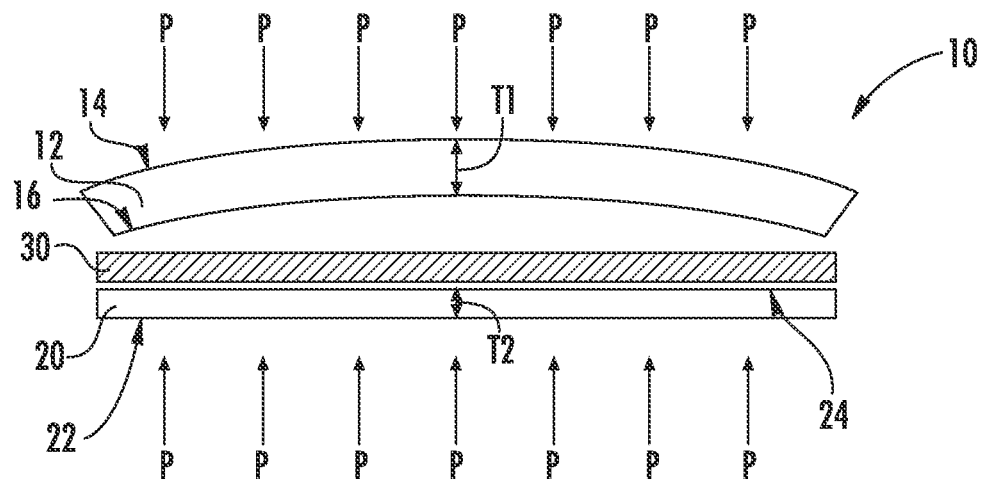
FIG. 1 is a cross-sectional view of a flat glass layer, a curved glass layer and an intervening film layer before shaping, according to an exemplary embodiment.
Figure 2:
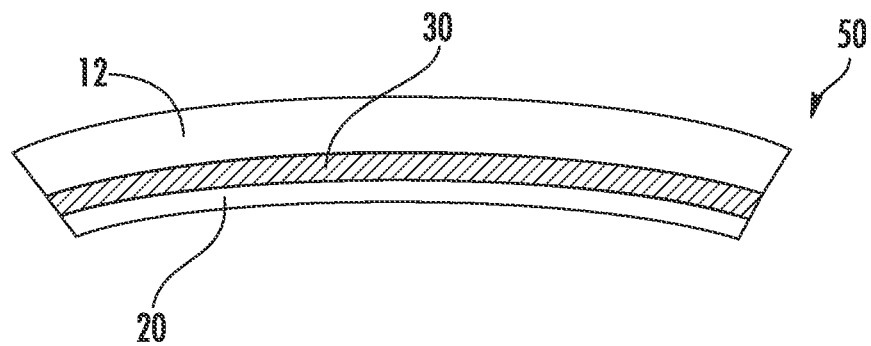
FIG. 2 is a cross-sectional view of a glass laminate article formed to a curved shape from the layers shown in FIG. 1, according to an exemplary embodiment.

Referring to FIG. 1 and FIG. 2, a cold-formed glass laminate article and a formation process are shown according to exemplary embodiments. As shown in FIG. 1, a laminate stack 10 includes a first glass layer 12 having a complexly curved shape. First glass layer 12 includes an outer surface 14 that includes at least one section that has a convex shape, and an inner surface 16 is opposite outer surface 14 and includes at least one section having a concave shape. A thickness, such as an average thickness T1, is defined between outer surface 14 and inner surface 16.

Laminate stack 10 also includes a second glass layer 20. Glass layer 20 includes an outer surface 22 and an inner surface 24 opposite of outer surface 22. A thickness, such as an average thickness T2, is defined between outer surface 22 and inner surface 24. In some embodiments, glass layer 20 is thinner than glass layer 12 such that T1>T2, and in specific embodiments, the glass material composition of glass layer 12 is different from the glass material composition of glass layer 20. In various embodiments, T1 is at least 2.5 times greater than T2, and in other embodiments, T2 is at least 2.5 times greater than T1. In specific embodiments, T1 is between 1.5 mm and 4 mm, and T2 is between 0.3 mm and 1 mm, and in even more specific embodiments, T2 is less than 0.6 mm. In specific embodiments: T1 is 1.6 mm and T2 is 0.55 mm; T1 is 2.1 mm and T2 is 0.55 mm; T1 is 2.1 mm and T2 is 0.7 mm; T1 is 2.1 mm and T2 is 0.5 mm; T1 is 2.5 mm and T2 is 0.7 mm.

Laminate stack 10 includes an interlayer 30 positioned between first glass layer 12 and the second glass layer 20. In this arrangement, interlayer 30 is located between inner surface 16 of first glass layer 12 and inner surface 24 of second glass layer 20. In specific embodiments, the interlayer 30 is affixed to at least one of inner surface 16 of first glass layer 12 and inner surface 24 of second glass layer 20 and acts to hold together laminate 50 following formation (shown in FIG. 2). Interlayer 30 may be a polymer interlayer such as a polyvinyl butyral layer.

FIG. 1 illustrates a cross-sectional view of laminate stack 10 before cold-forming, and FIG. 2 illustrates a glass laminate article, laminate 50, formed from laminate stack 10 via cold-forming. As shown in FIG. 1, first glass layer 12 is supported (e.g., on a frame), and second glass layer 20 is positioned to be supported on first glass layer 12. Polymer interlayer 30 is positioned between first glass layer 12 and second glass layer 20.

As shown in FIG. 1, first glass layer 12 is formed in a curved shape prior to beginning of the cold-forming process, and second glass layer 20 is flat prior to the forming process. During the cold-forming process of FIG. 1, pressure, shown by the arrows P, is applied to the stack such that the second glass layer 20, interlayer 30, and first glass layer 12 are pressed together. Under pressure P, second glass layer 20 deforms to take on the curved shape of first glass layer 12, and once second glass layer 20 has been shaped to match the shape of first glass layer 12, first glass layer 12 and second glass layer 20 are bonded together by the interlayer 30, forming the complexly curved article 50, shown in FIG. 2.

As can be seen in FIG. 2 following shaping, second glass layer 20 also has a curved shape such that outer surface 22 includes at least one section that has a concave shape and that inner surface 24 includes at least one section having a convex shape. The shaping process shown ensures that the shape and curvature of second glass layer 20 closely matches the shape and curvature of first glass layer 12. Thus, in this arrangement, second glass layer 20 is bent to conform to the complex curved shape of first glass layer 12 via pressure P, without the temperature being raised above the glass transition temperature of the glass material of second glass layer 20 and/or of the glass material of first glass layer 12.

In various embodiments, the shaping pressure, represented by arrows P may be about 1 atmosphere or greater. The shaping pressure may be air pressure and/or pressure applied via a press or die.

In various embodiments, first glass layer 12 is formed to its complexly curved shape via a hot forming process, and then is cooled prior to the cold-forming process shown in FIG. 1. In specific embodiments, hot forming first glass layer 12 may include heating it to a temperature near the softening point of the glass material of first glass layer 12 and then bending it to the complexly curved shape.

During the forming process of FIG. 1, the complexly curved first glass layer 12 and the flat second glass layer 20 are cold-formed into the curved laminate 50 at a temperature well below the softening point of the glass material of second glass layer 20 and/or of the glass material of first glass layer 12. In various embodiments, the cold-forming process of FIG. 1 occurs at a temperature that is 200 degrees C. or more below the softening point of the glass material of second glass layer 20 and/or of the glass material of first glass layer 12. Softening point refers to the temperature at which glass will deform under its own weight. In one or more specific embodiments, the temperature during the cold-forming process is below about 400 degrees C., below about 350 degrees C., or below about 300 degrees C. In one specific embodiment the cold-forming process is in the range of room temperature to about 140 degrees C. C Room temperature can be considered to be the ambient temperature of a production floor (e.g., 16 degrees C. to about 35 degrees C.).

As shown in FIG. 1, interlayer 30 is located between glass layers 12 and 20 during cold-forming. In some such embodiments, interlayer 30 acts to bond together glass layers 12 and 20 before or during cold forming. In some such embodiments, stack 10 is heated to a temperature in the range of about 100 degrees C. to about 140 degrees C. during application of pressure P in order to form a bond between interlayer 30 and glass layers 12 and 20.

As shown in FIGS. 3-8, in various embodiments, laminate 50 is shown shaped into a variety of complex curved shapes to illustrate various geometric parameters that may be used to determine a CFE value. As shown in FIGS. 3-8, geometric parameters of first glass layer 12 that may be utilized to calculate the CFE value may include a width, W, a length, L, a chord height, CH, a depth of bend (DOB), a minimum primary radius of curvature, R1, a secondary minimum radius of curvature, R2, and a maximum Gaussian curvature, GC. In specific embodiments, determination of the CFE value may also include additional geometric parameters such as thickness, T1, of first glass layer 12 and thickness, T2, of second glass layer 20.

Figure 3:
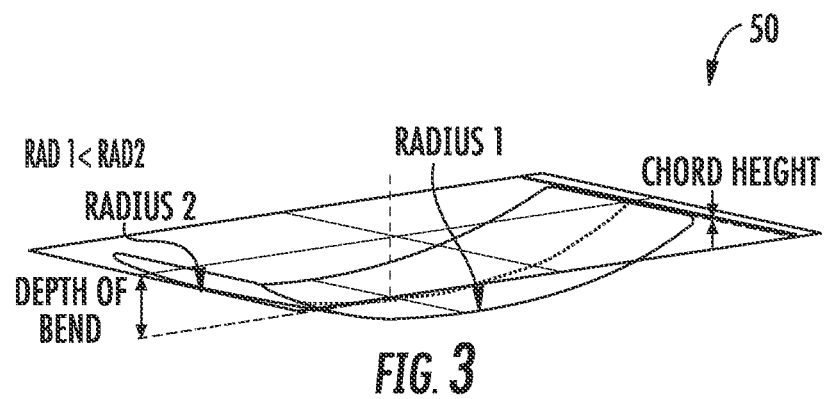
FIG. 3 is a perspective view of a glass laminate article shaped as a windshield, according to an exemplary embodiment.
Figure 4:
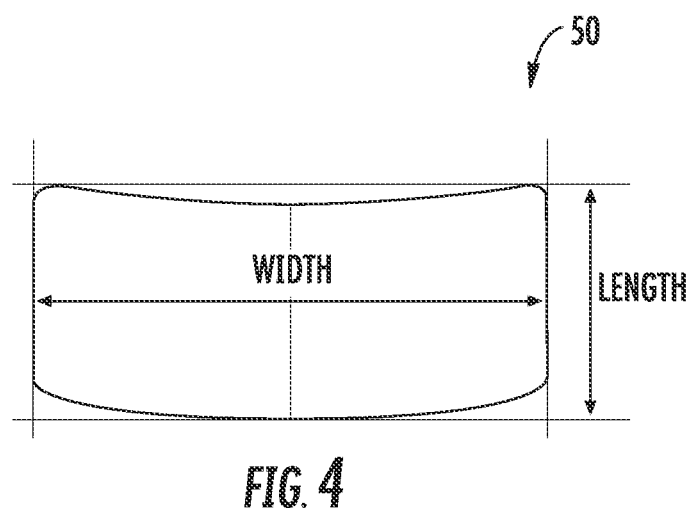
FIG. 4 is a top plan view of the glass laminate article of FIG. 3.
Figure 5:
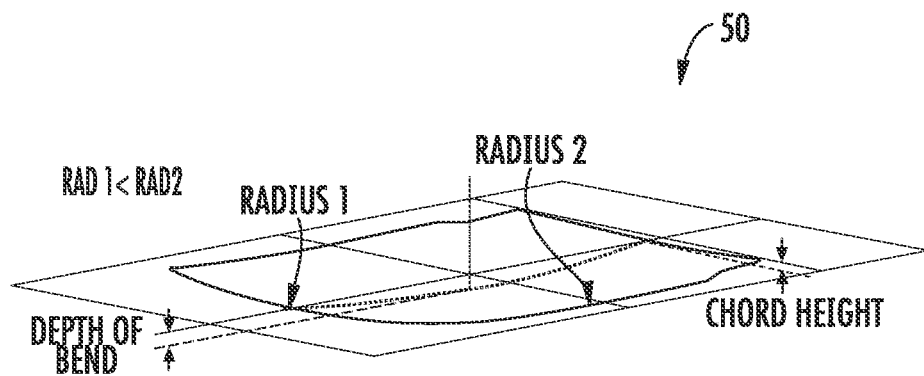
FIG. 5 is a perspective view of a glass laminate article shaped as a roof, according to an exemplary embodiment.
Figure 6:
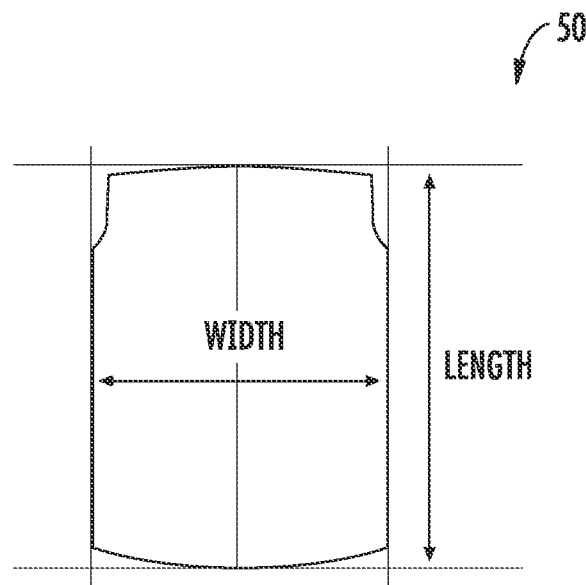
FIG. 6 is a top plan view of the glass laminate article of FIG. 5.
Figure 7:
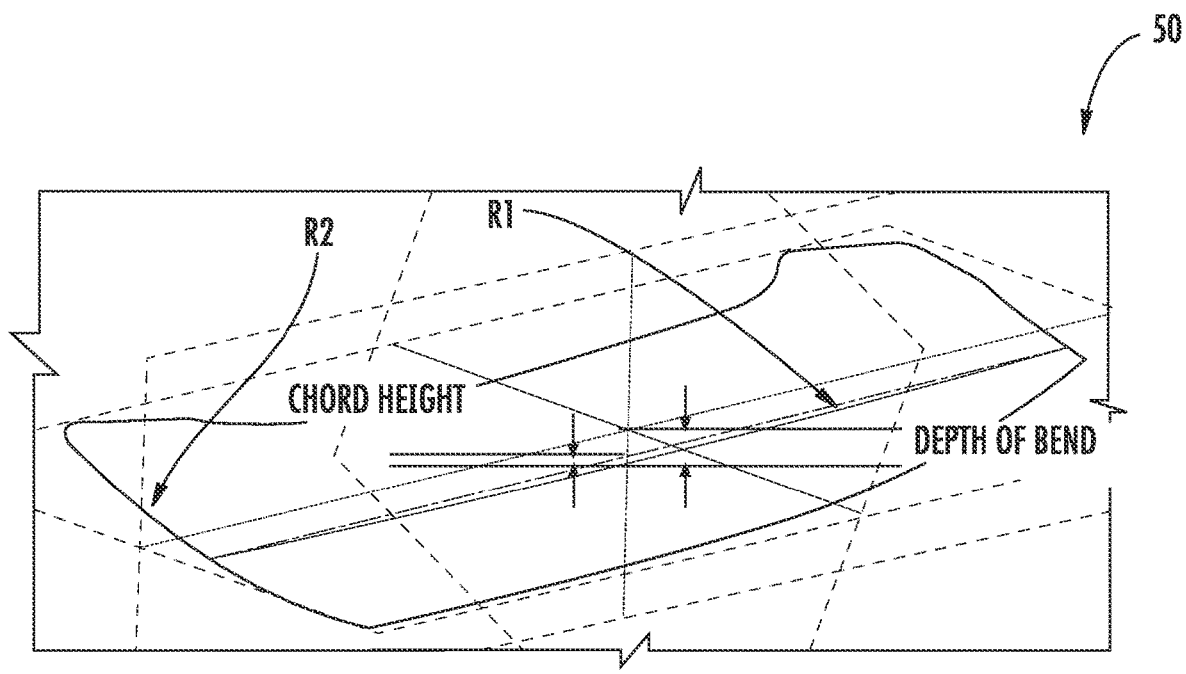
FIG. 7 is a perspective view of a glass laminate article shaped as a side window, according to an exemplary embodiment.
Figure 8:
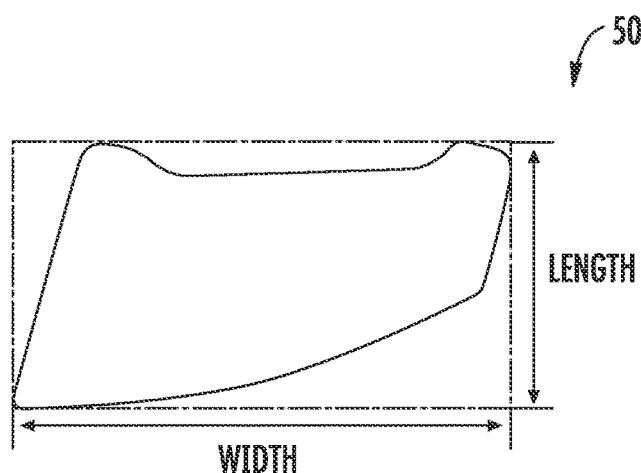
FIG. 8 is a top plan view of the glass laminate article of FIG. 7.

As shown in FIGS. 3-8, glass laminate article 50 may be shaped into a variety of shapes for a wide variety of applications. For example, FIGS. 3-4 show glass laminate article 50 shaped to form an automotive windshield according to an exemplary embodiment. FIGS. 5-6 show glass laminate article 50 shaped to form an automotive roof/sunroof/moon roof according to an exemplary embodiment. FIGS. 7-8 show glass laminate article 50 shaped to form an automotive side window (e.g., a sidelight) according to an exemplary embodiment.

As can be seen in FIGS. 3-8, it may be desirable for glass laminate article 50 to be shaped into a wide variety of complexly curved shapes as may be needed for a particular application, vehicle body design, etc. Typically, to determine whether a particular glass laminate article design is suitable for cold-forming, complicated and processing intensive finite element analysis (FEA) would need to be conducted to determine whether stresses within the glass layers during cold-bending would be too high and thus cause defects. Because of the large number of potential article shapes and designs and the need for fast production, Applicant has developed a process for predicting whether a glass laminate article shape is suitable for cold-forming utilizing a relatively simple calculation that does not rely on FEA or other computer modeling techniques.

Further, FIGS. 3-8 illustrate different geometric parameters that may be used to calculate a CFE value as discussed herein. As shown in FIGS. 3-8, glass laminate article 50 (or one of the glass layers of article 50) includes a width, W, a length, L, a chord height, CH, a depth of bend (DOB), a minimum primary radius of curvature, R1, a secondary minimum radius of curvature, R2, and a maximum Gaussian curvature, GC. As shown in FIG. 1 glass layers 12 and 20 also have average thicknesses, T1 and T2. In the specific embodiments discussed herein, these dimensions are defined as follows: width, WI, is the width of a minimum bounding box containing the glass laminate article 50; length, L1, is the length of a minimum bounding box containing glass laminate article 50; depth of bend, DOB, is the maximum depth of glass laminate article 50 from the projection plane; chord height, CH, is the maximum perpendicular distance between the center line chord and the arc of the glass surface of glass laminate article 50; a minimum primary radius of curvature, R1, is the minimum radius along primary bending curvature direction; secondary minimum radius of curvature, R2, is the minimum radius along cross bending curvature direction; Gaussian Curvature is the product of the principal curvatures at a point, where principal curvatures are the minimum and maximum of the normal curvatures at a point, and normal curvatures are the curvatures of curves on the surface lying in planes including the tangent vector at the given point.

As will be discussed in more detail below, various combinations of these geometric parameters are used for a variety of CFE values.

Figure 9:
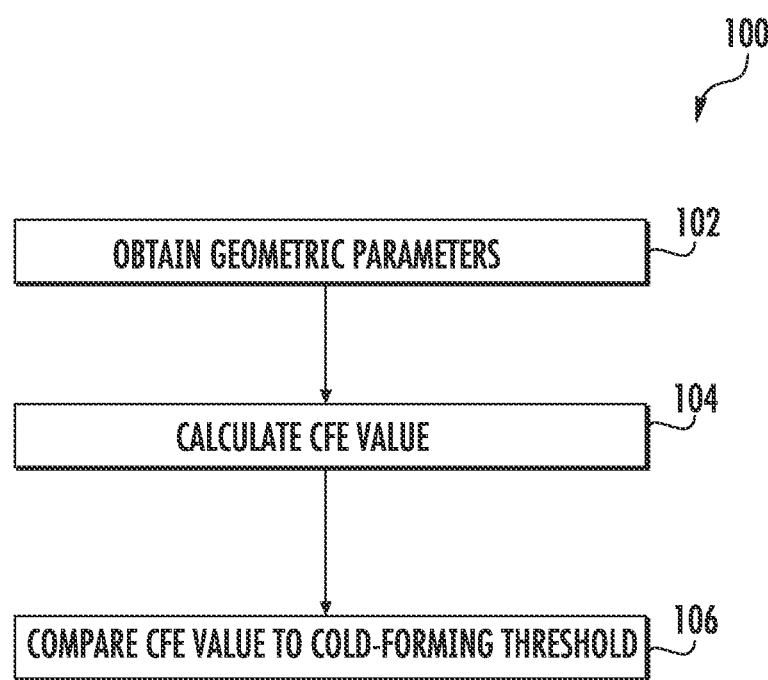
FIG. 9 shows a process for estimating cold-formability of a complexly curved glass laminate article, according to an exemplary embodiment.

In general, referring to FIG. 9, the present disclosure provides a method 100 of estimating cold-formability of a complexly curved glass laminate article, such as article 50. At step 102, a plurality of geometric parameters, such a first geometric parameter (G1) and a second geometric parameter (G2), of a complexly curved first glass sheet of the glass laminate article are obtained. As will be discussed below, in various embodiments, more than two geometric parameters may be utilized in the cold-formability estimation methods discussed herein. At step 104, a cold-forming estimator (CFE) value related to stress experienced by the first glass sheet during cold-forming is calculated. At step 106, the calculated CFE value is compared to a cold-forming threshold which is related to the probability that defects will be formed in the complexly curved glass laminate article during cold-forming.

In general, the comparison at step 106 is then used to determine whether or not a particular design for a complexly curved article 50 is suitable for cold-forming. In specific embodiments, a cold-forming method such as that discussed above in relation to FIG. 1 is then performed if CFE value is less than the cold-forming threshold. Because of the correlation between the various CFE values discussed herein and the first principle stress experienced by the first glass layer during cold forming, when cold-forming is performed on a glass laminate article that has a CFE value less than the cold-forming threshold, the stresses within glass laminate article 50 during cold-forming remain at a level that causes defects.

In general, the CFE value is a summation of two or more geometric parameters associated with glass laminate article 50 (multiplied by calculated coefficients as discussed herein) which Applicant has determined provide a high level of correlation to stresses experienced during cold-forming. Thus, by calculating a CFE value as discussed herein a determination of cold-formability of a particular glass laminate design can be made without the need to perform FEA for a particular design or to prototype and test a particular design. Thus, while the CFE value may be calculated in a variety of ways as will be discussed herein, in one embodiment, the CFE value is B1*G1+B2*G2, wherein B1 and B2 are coefficients calculated using statistical methods to relate G1 and G2 to the glass laminate article is suitable for cold-forming.

In general, coefficients B1 and B2 (and coefficients for any additional geometric parameters that may be used to calculate the CFE value) are determined by multiple linear regression analyses of finite element analysis-determined stresses of multiple complexly curved glass laminate articles. Thus, by calculating the linear regression analysis on a dataset of FEA determined stresses for multiple complex curved articles, the impact or relation of G1 and G2 (and additional geometric parameters as discussed below) to the stress experienced during cold forming can be determined. This analysis provides the value for coefficients B1 and B2 to be determined. Once B1 and B2 (and coefficients for any additional geometric parameters that may be used to calculate the CFE value) are determined, the CFE value can be calculated as the summation of the desired set of geometric parameters multiplied by the coefficient, without the need to run FEA for each new design evaluated.

Applicant believes that the coefficients, such as B1 and B2, are functions of the glass materials of first glass layer 12 and second glass layer 20. Thus, B1 and B2 (and coefficients for any additional geometric parameters that may be used to calculate the CFE value) will be determined via linear regression analysis for the material types of the glass layers of a particular glass laminate article, and then can be used to calculate the CFE value for different sizes, shapes, curvatures, etc. of different laminate designs without conducting FEA for each new design.

Further, the cold-forming threshold is also believed to be a function of the glass materials of first glass layer 12 and second glass layer 20. In various embodiments, the cold-forming threshold is related to a maximum allowable stress that first glass sheet 12 can experience without defect formation. In specific embodiments, the cold-forming threshold is determined by evaluating whether defects are present in laminated test samples of a variety of sizes and shapes, and then by correlating the presence or absence of defects to stress levels expected during cold bending that are calculated using finite element analysis or through measurement. Further, Applicant believes that the cold forming threshold is a function of the strength of the material of layers 12 and 20.

In a specific embodiment, the first geometric parameter, G1, is L/W, the second geometric parameter, G2 is the chord height, CH, B1 is 1 and B2=0.5. Thus in such embodiments, the CFE value is determined by:

$$CFE = (L/W + 0.5\ CH) \qquad \text{Equation 1}$$

When the value of Equation 1 is less than a determined cold-forming threshold, a determination is made that the glass laminate article having L, W and CH is cold-formable. In a specific embodiment, when $-0.14 < (L/W - 0.5\ CH) < 0.223$, a determination is made that the glass article having L, W and CH is cold-formable, and in such embodiments, a laminate glass article 50 may be formed having a shape and size such that $-0.14 < L/W - 0.05*(CH) < 0.223$. In some such embodiments, first glass layer 12 is formed from a soda lime glass material, and second glass layer 20 is formed from an alkali aluminosilicate glass composition or an alkali aluminoborosilicate glass composition.

In another specific embodiment, G1=the chord height, CH, G2=maximum Gaussian curvature, GC, B1=1 and B2=1. Thus in such embodiments, CFE=(CH+GC), and when this value is less than a determined cold-forming threshold, a determination is made that the glass article having GC and CH is cold-formable. In a specific embodiment, when $8 < (GC + CH) < 20$, a determination is made that the glass article having GC and CH is cold-formable. In some such embodiments, first glass layer 12 is formed from a soda lime glass material, and second glass layer 20 is formed from an alkali aluminosilicate glass composition or an alkali aluminoborosilicate glass composition.

In another specific embodiment, first glass layer 12 includes a width, W, a length, L, a chord height, CH, a depth of bend (DOB), a minimum primary radius of curvature, R1, a secondary minimum radius of curvature, R2, average thickness, T1, and a maximum Gaussian curvature, GC. In addition, second glass layer 20 includes a thickness, T2. In such embodiments, the CFE value is a predicted stress value and is determined by:

$$CFE = B0 + B1*W + B2*L + B3*DOB + B4*CH + B5*R1 + B6*R2 + B7*GC + B8*T1 + B9*T2) \qquad \text{Equation 2}$$

In this embodiment the units for the 9 geometric parameters are as follows: W (mm), L (mm), DOB (mm), CH (mm), R1 (mm), R2 (mm), the maximum GC in $10^{-7}$ ($1/mm^2$), T1 (mm) and the T2 (mm). The constant coefficients, B0-B9, for each geometric parameter are determined from an FEA dataset for glass laminate articles 50 having different geometric parameters but formed from the same materials.

In a particular embodiment, B0-B9 were calculated from a data set of FEA determined stress for 29 different glass laminate article designs and are as shown in Table 1.

TABLE 1

| | Width (mm) | Length (mm) | DOB (mm) | Chord H (mm) | Min. R1 (mm) | Min. R2 (mm) | Max. GC ($10^{-7}$ mm$^{-2}$) | T1 (mm) | T2 (mm) |
|---|---|---|---|---|---|---|---|---|---|
| $\beta_0$ | $\beta_1$ | $\beta_2$ | $\beta_3$ | $\beta_4$ | $\beta_5$ | $\beta_6$ | $\beta_7$ | $\beta_8$ | $\beta_9$ |
| 0 | 0.05673 | −0.1035 | −0.0031 | 6.99003 | 0.01855 | 0.00115 | 4.633988 | −0.1836 | −101.95 |

Using this data, Equation 2 becomes:

$$CFE = 0.05673*W - 0.1035*L - 0.0031*DOB + 6.99003*CH + 0.01855*R1 + 0.00115*R2 + 4.633988*GC - 0.1836*T1 - 101.95*T2.$$  Equation 3

Then for a given design of a glass laminate article 50, the value of Equation 3 is then compared to the cold-forming threshold to determine cold formability. In specific embodiments, utilizing this equation, the cold-forming threshold is 80 MPa, 50 MPa, or 20 MPa. Thus in such embodiments, a laminate glass article 50 is formed having a shape and size such that is $(0.05673*W - 0.1035*L - 0.0031*DOB + 6.99003*CH + 0.01855*R1 + 0.00115*R2 + 4.633988*GC - 0.1836*T1 - 101.95*T2) < 80$ MPa.

As will be understood in this embodiment, W, L, CH, DOB, R1, R2, T1 and GC are all geometric parameters of first layer 12, and T2 is a geometric parameter of second glass layer 20. The coefficients shown in Equation 3 were determined using linear regression analysis as described above. In some such embodiments, first glass layer 12 is formed from a soda lime glass material, and second glass layer 20 is formed from an alkali aluminosilicate glass composition or an alkali aluminoborosilicate glass composition.

In specific embodiments, first glass layer 12 is formed from an unstrengthened glass sheet, and the cold-forming threshold is determined to be 20 MPa. In this embodiment, the CFE value is a predicted stress value and is given by Equation 3. In such embodiments, the method of predicting cold-formability includes determining that a particular design for glass laminate article 50 is suitable for cold-forming, when the calculated CFE value of Equation 30 is less than the 20 MPa.

In another specific embodiment, first glass layer 12 is formed from a strengthened glass sheet (e.g., a thermally strengthened glass material, a chemically strengthened glass sheet, etc.), and the cold-forming threshold is determined to be 50 MPa. In this embodiment, the CFE value is a predicted stress value and is given by Equation 3. In such embodiments, the method of predicting cold-formability includes determining that a particular design for glass laminate article 50 is suitable for cold-forming, when the calculated CFE value of Equation 3 is less than the 50 MPa.

In various embodiments, first glass layer 12 is formed from a soda lime glass material, and second glass layer 20 is formed from an alkali aluminosilicate glass composition or an alkali aluminoborosilicate glass composition. In some such embodiments, glass layer 20 is chemically strengthened via ion exchange. In some embodiments, first glass layer 12 may be annealed. In some embodiments, both layers 12 and 20 are formed from soda lime glass. In other embodiments, both layers 12 and 20 are formed from an alkali aluminosilicate glass composition or an alkali aluminoborosilicate glass composition.

In various embodiments, W is between 300 mm and 1800 mm, L is between 230 mm and 1600 mm, CH is between 1 mm and 45 mm, DOB is between 5 mm and 210 mm, R1 is between 40 mm and 5000 mm, R2 is between 740 mm and 32500 mm, GC is between $0.14 \times 10^{-7}$ 1/mm$^2$ and $15 \times 10^{-7}$ 1/mm$^2$, T1 is between 1 mm and 4 mm, and T2 is between 0.3 mm and 1 mm.

Figure 10:
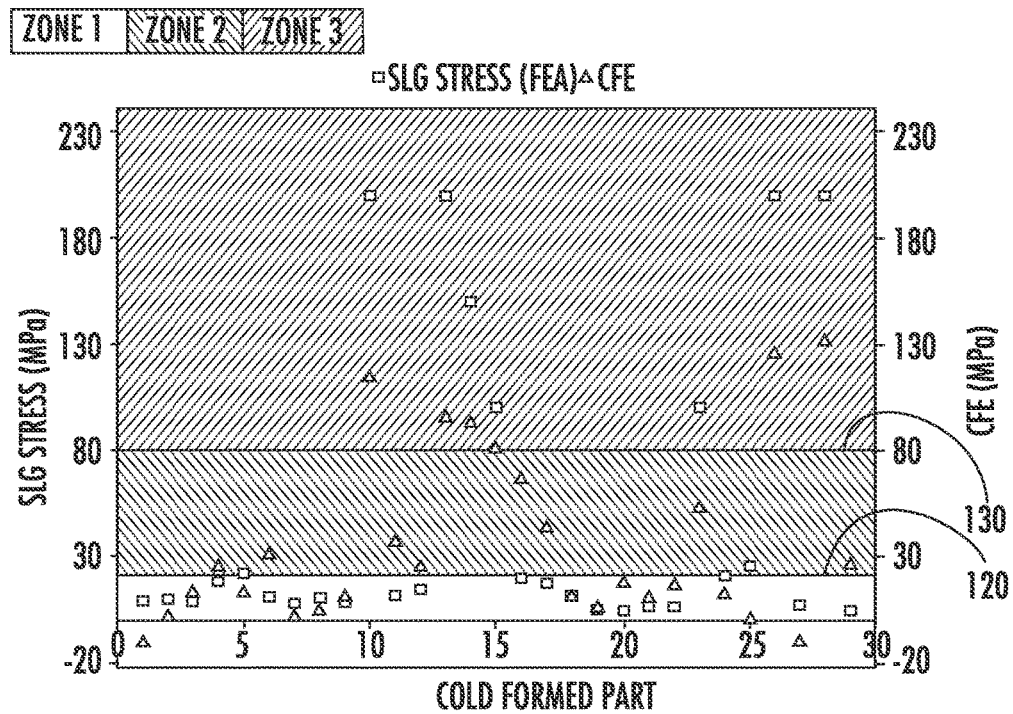
FIG. 10 shows a comparison of the CFE value calculated using Equation 3 for 29 different designs for glass laminate article 50 relative to the corresponding FEA calculated stresses.

To provide further examples, FIGS. 10-14C show the plots of data showing the relation between various CFE values and various cold-forming thresholds. FIG. 10 shows a comparison of the CFE value calculated using Equation 3 for 29 different designs for glass laminate article 50 in relation to the FEA calculated stresses for the designs. As can be seen in FIG. 10, when the CFE value calculated using Equation 3 is below cold-forming threshold 120, the FEA determined stress for a particular glass article design is also less than cold forming threshold 120, and this relation indicates that the article is cold-formable. In this embodiment, cold-forming threshold 120 is 20 MPa.

As shown in FIG. 10, an upper cold forming threshold 130 can also be determined. As can be seen in FIG. 10, when the CFE value calculated using Equation 3 is above cold-forming threshold 130, the FEA determined stress for a particular glass article design is also above the cold forming threshold 130, and this indicates that the article is not cold-formable. If the CFE value calculated using Equation 3 is between threshold 120 and threshold 130 the correlation between the calculated CFE value and the FEA stress value is low, and therefore in this range, FEA stress should be calculated to determine whether or not a particular glass laminate design in this range is cold-formable because the predictive value of the CFE value is low. In specific embodiments, threshold 130 is based on the B10 values of the material of first glass layer 12 (soda-lime glass in the specific embodiment shown) based on Weibull distribution, and threshold 120 is determined as the threshold below which the chances of forming wrinkling layer 20 is acceptably low. By way of explanation, during cold forming process, stress builds up on both layers of a glass laminate article. Typically one of the layers (e.g., the soda-lime glass layer) has a much lower strength compared to other layer (e.g., a chemically strengthened layer). Therefore, the weaker is used to determine the threshold of the strength during bending.

Figure 11A:
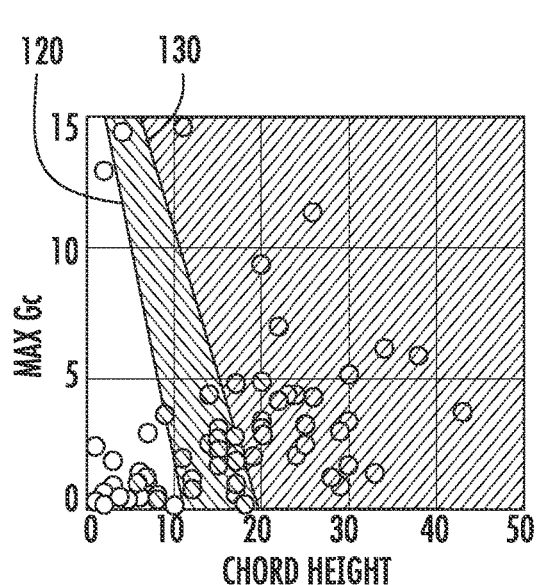
FIGS. 11A and 11B are 2D plots of data from FIG. 10 showing the relation between select geometric parameters and cold-forming thresholds.
Figure 11B:
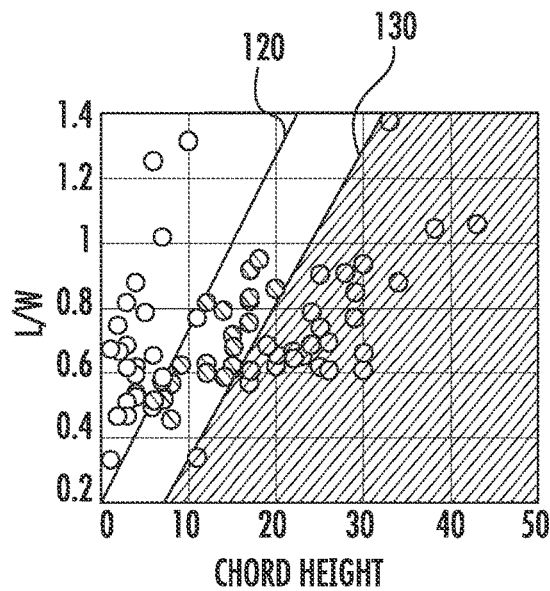

FIGS. 11A and 11B are 2D plots of data from FIG. 10 showing the relation between select geometric parameters and cold-forming thresholds 120 and 130. FIG. 11A is a 2D map created using maximum GC and chord height, and FIG. 11B is a 2D map created using chord height, CH, and L/W. Both maps in FIGS. 11A and 11B are divided into three regions separated by cold-forming thresholds 120 and 130, respectively. Most data points are in the desired region with a few exceptions. FIG. 11A shows a clear correlation between the two parameters, max GC and CH: when the chord height increases, the max GC should be reduced in order to ensure the laminate article is cold formable. Similarly, FIG. 11B shows a clear correlation between the two parameters, L/W and chord height, CH: when the chord height increases, L/W needs to increase to make glass laminate article cold formable.

Figure 12A:
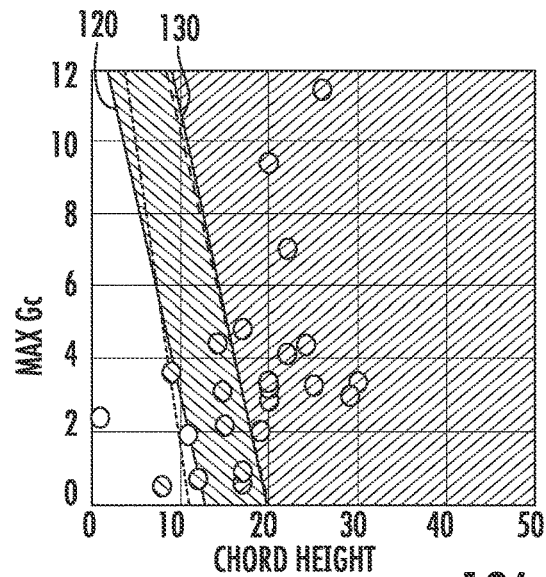
FIGS. 12A-12C are 2D plots of data from the glass laminate articles of FIG. 10 designed for windshields.
Figure 12B:
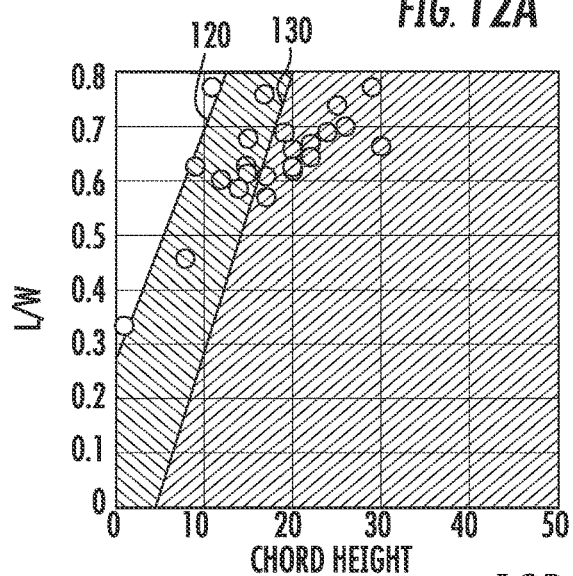
Figure 12C:
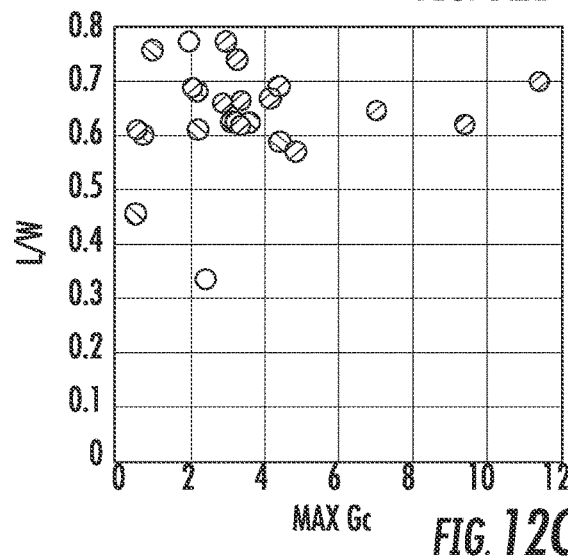

FIGS. 12A-12C are 2D plots from the glass laminate articles from FIG. 10 designed for windshields. As shown in FIG. 12B, the L/W value for the windshield designs is mainly distributed over the range of 0~0.8. The windshield data has cold forming thresholds 120 and 130 similar to the overall data in the Max GC-Chord Height plot (FIG. 11A) and L/W-Chord Height plot (FIG. 11B).

Figure 13A:
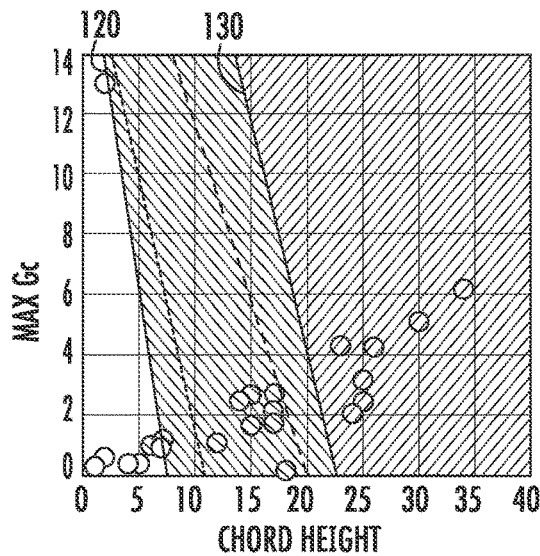
FIGS. 13A-13C are 2D plots of data from the glass laminate articles of FIG. 10 designed for roofs.
Figure 13B:
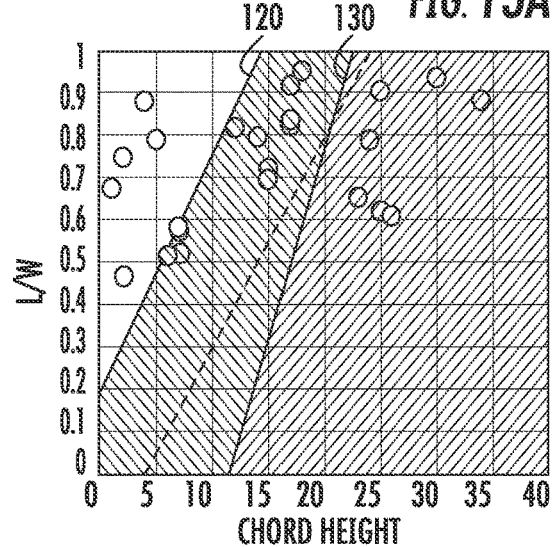
Figure 13C:
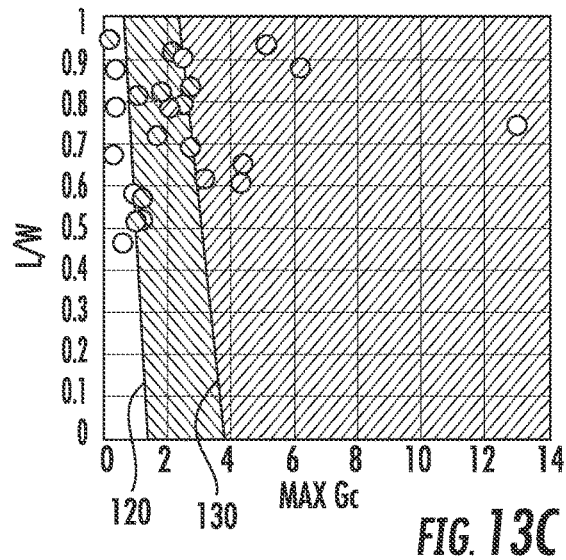

FIGS. 13A-13C are 2D plots from the glass laminate articles from FIG. 10 designed for roofs. As shown in FIG. 13B, the L/W value is mainly distributed over the range of 0~1.0. As shown, the roof data has a wider zone between thresholds 120 and 130 as compared to the overall data (FIGS. 11A and 11B).

Figure 14A:
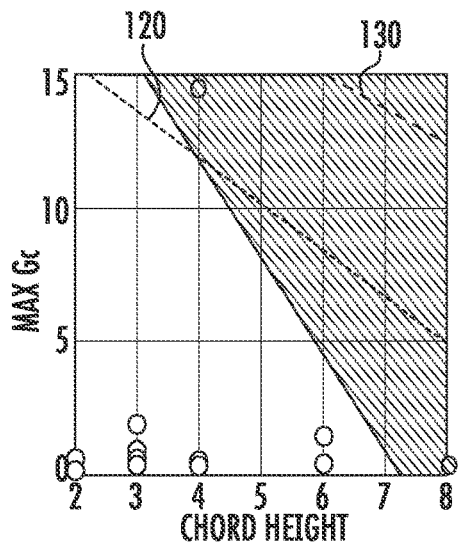
FIGS. 14A-14C are 2D plots of data from the glass laminate articles of FIG. 10 designed for side windows (e.g., sidelights).
Figure 14B:
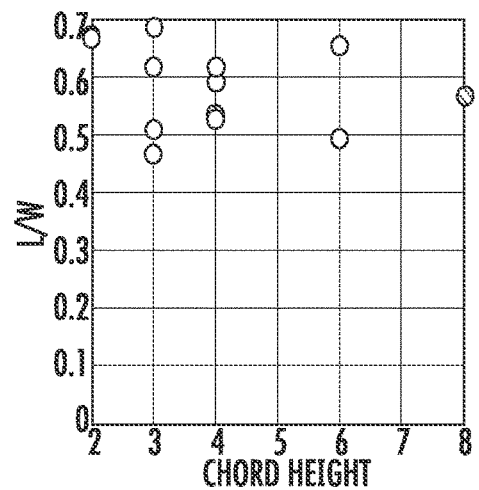
Figure 14C:
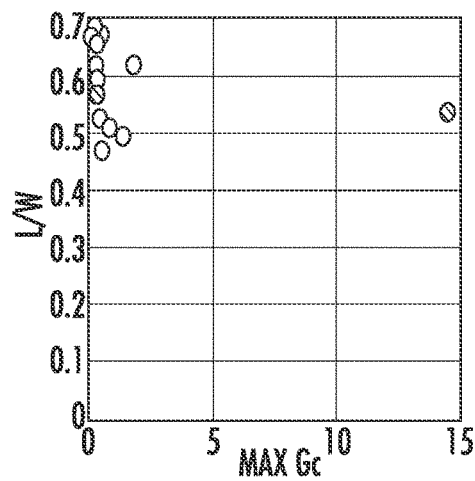

FIGS. 14A-14C are 2D plots from the glass laminate articles from FIG. 10 designed for side windows (e.g, sidelights). As shown in FIG. 14B, the L/W value is mainly distributed over the range of 0~0.7.

Figure 15:
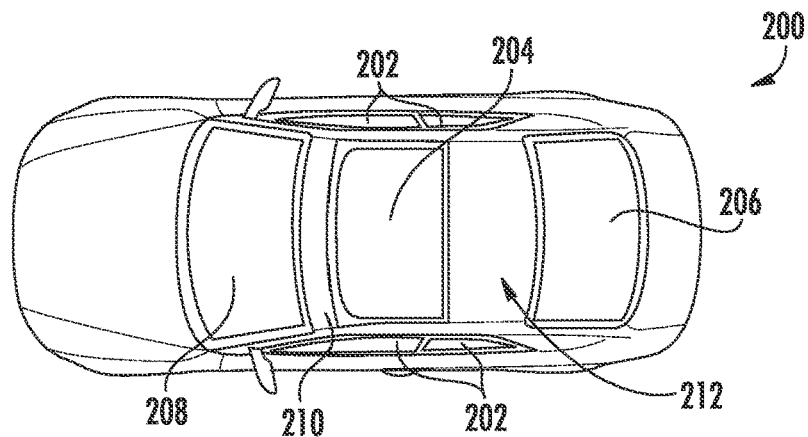
FIG. 15 is a vehicle equipped with one or more glass laminate articles as discussed herein.

Referring to FIG. 15, use of glass laminate article 50 as part of a vehicle window, roof or side window, is shown. As shown, a vehicle 200 includes one or more side window 202, a roof 204, a back window 206 and/or a windshield 208. In general, any of the embodiments of glass laminate article 50 discussed herein may be used for one or more side window 202, a roof 204, a back window 206 and/or a windshield 208. In general, one or more side window 202, a roof 204, a back window 206 and/or a windshield 208 are supported within an opening defined by vehicle frame or body 210 such that outer surface 22 of second glass layer 20 (see FIG. 1) faces a vehicle interior 212. In this arrangement, outer surface 14 of first glass layer 12 (see FIG. 1) faces toward the exterior of vehicle 200 and may define the outermost surface of vehicle 200 at the location of the glass article. As used herein, vehicle includes automobiles, rolling stock, locomotive, boats, ships, airplanes, helicopters, drones, space craft and the like. In other embodiments, glass laminate article 50 may be used in a variety of other applications where thin, curved glass laminate articles may be advantageous, such as for architectural glass, building glass, etc.

As used herein "complex curve" and "complexly curved" mean a non-planar shape having curvature along two orthogonal axes that are different from one another. Examples of complexly curved shapes includes having simple or compound curves, also referred to as non-developable shapes, which include but are not limited to spherical, aspherical, and toroidal. The complexly curved laminates according to embodiments may also include segments or portions of such surfaces, or be comprised of a combination of such curves and surfaces. In one or more embodiments, a laminate may have a compound curve including a major radius and a cross curvature. A complexly curved laminate according to embodiments may have a distinct radius of curvature in two independent directions. According to one or more embodiments, complexly curved laminates may thus be characterized as having "cross curvature," where the laminate is curved along an axis (i.e., a first axis) that is parallel to a given dimension and also curved along an axis (i.e., a second axis) that is perpendicular to the same dimension. The curvature of the laminate can be even more complex when a significant minimum radius is combined with a significant cross curvature, and/or depth of bend.

Some laminates may also include bending along axes that are not perpendicular to one another. As a non-limiting example, the complexly-curved laminate may have length and width dimensions of 0.5 m by 1.0 m and a radius of curvature of 2 to 2.5 m along the minor axis, and a radius of curvature of 4 to 5 m along the major axis. In one or more embodiments, the complexly-curved laminate may have a radius of curvature of 5 m or less along at least one axis. In one or more embodiments, the complexly-curved laminate may have a radius of curvature of 5 m or less along at least a first axis and along the second axis that is perpendicular to the first axis. In one or more embodiments, the complexly-curved laminate may have a radius of curvature of 5 m or less along at least a first axis and along the second axis that is not perpendicular to the first axis.

Glass layers 12 and/or 20 can be formed from a variety of materials. In specific embodiments, glass layer 20 is formed from a chemically strengthened alkali aluminosilicate glass composition or an alkali aluminoborosilicate glass composition, and glass layer 12 is formed from a soda lime glass (SLG) composition. In specific embodiments, glass layers 12 and/or 20 are formed from a chemically strengthened material, such as an alkali aluminosilicate glass material or an alkali aluminoborosilicate glass composition, having a chemically strengthened compression layer having a depth of compression (DOC) in a range from about 30 μm to about 90 μm, and a compressive stress on at least one of the sheet's major surfaces of between 300 MPa to 1000 MPa. In some embodiments, the chemically strengthened glass is strengthened through ion exchange.

Examples of Glass Materials and Properties

In various embodiments, glass layers 12 and/or 20 may be formed from any of a variety of glass compositions. Examples of glasses that may be used for glass layers 12 and/or 20 described herein may include soda-lime silicate glass compositions, aluminosilicate glass compositions, alkali aluminosilicate glass compositions or alkali aluminoborosilicate glass compositions, though other glass compositions are contemplated. In one or more embodiments, suitable glass compositions may be characterized as ion exchangeable. As used herein, "ion exchangeable" means that the layer comprising the composition is capable of exchanging cations located at or near the surface of the glass layer with cations of the same valence that are either larger or smaller in size. In one exemplary embodiment, the glass composition of glass layers 12 and/or 20 comprises $SiO_2$, $B_2O_3$ and $Na_2O$, where $(SiO_2 30 B_2O_3) \geq 66$ mol. %, and $Na_2O \geq 9$ mol. %. Suitable glass compositions for glass layers 12 and/or 20, in some embodiments, further comprise at least one of $K_2O$, MgO, and CaO. In a particular embodiment, the glass compositions used in glass layers 12 and/or 20 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example of glass composition suitable for glass layers 12 and/or 20 comprises: 60-70 mol. % $SiO_2$; 6-14 mol. % $Al_2O_3$; 0-15 mol. % B2O3; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $(MgO+CaO) \leq 10$ mol. %.

Even further, another example of glass composition suitable for glass layers 12 and/or 20 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $Sn_2$; 0.05-0.5 mol. % $CeO_2$; less than 50 ppm $As_2O_3$; and less than 50 ppm $Sb_2O_3$; where 14 mol. % $(Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for glass layers 12 and/or 20 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma \text{ modifiers}) > 1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio(($Al_2O_3+B_2O_3$)/Σ modifiers)>1.

In still another embodiment, glass layers 12 and/or 20 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. %≤MgO+CaO+SrO≤8 mol. %; ($Na_2O$+$B_2O_3$)−$Al_2O_3$23 2 mol. %; 2 mol. % $Na_2O$−$Al_2O_3$≤6 mol. %; and 4 mol. %≤($Na_2O$+$K_2O$)−$Al_2O_3$≤10 mol. %.

In an alternative embodiment, glass layers 12 and/or 20 may comprise an alkali aluminosilicate glass composition comprising: 2 mol % or more of $Al_2O_3$ and/or $ZrO_2$, or 4 mol % or more of $Al_2O_3$ and/or $ZrO_2$. In one or more embodiments, glass layers 12 and/or 20 comprise a glass composition comprising $SiO_2$ in an amount in the range from about 67 mol % to about 80 mol %, $Al_2O_3$ in an amount in a range from about 5 mol % to about 11 mol %, an amount of alkali metal oxides ($R_2O$) in an amount greater than about 5 mol % (e.g., in a range from about 5 mol % to about 27 mol %). In one or more embodiments, the amount of $R_2O$ comprises $Li_2O$ in an amount in a range from about 0.25 mol % to about 4 mol %, and $K_2O$ in an amount equal to or less than 3 mol %. In one or more embodiments, the glass composition includes a non-zero amount of MgO, and a non-zero amount of ZnO.

In other embodiments, glass layers 12 and/or 20 are formed from a composition that exhibits $SiO_2$ in an amount in the range from about 67 mol % to about 80 mol %, $Al_2O_3$ in an amount in the range from about 5 mol % to about 11 mol %, an amount of alkali metal oxides ($R_2O$) in an amount greater than about 5 mol % (e.g., in a range from about 5 mol % to about 27 mol %), wherein the glass composition is substantially free of $Li_2O$, and a non-zero amount of MgO; and a non-zero amount of ZnO.

In other embodiments, glass layers 12 and/or 20 are an aluminosilicate glass article comprising: a glass composition comprising $SiO_2$ in an amount of about 67 mol % or greater; and a sag temperature in a range from about 600° C. to 710° C. In other embodiments, glass layers 12 and/or 20 are formed from an aluminosilicate glass article comprising: a glass composition comprising $SiO_2$ in an amount of about 68 mol % or greater; and a sag temperature in a range from about 600° C. to about 710° C. (as defined herein).

In some embodiments, glass layers 12 and/or 20 are formed from different glass materials from each other that differs in any one or more of composition, thickness, strengthening level, and forming method (e.g., float formed as opposed to fusion formed). In one or more embodiments, glass layers 12 and/or 20 described herein have a sag temperature of about 710° C., or less or about 700° C. or less. In one or more embodiments, one of the glass layers 12 and 20 is a soda lime glass sheet, and the other of the glass layers 12 and 20 is any one of the non-soda lime glass materials discussed herein. In one or more embodiments, glass layers 12 and/or 20 comprises a glass composition comprising $SiO_2$ in an amount in the range from about 68 mol % to about 80 mol %, $Al_2O_3$ in an amount in a range from about 7 mol % to about 15 mol %, $B_2O_3$ in an amount in a range from about 0.9 mol % to about 15 mol %; a non-zero amount of $P_2O_5$ up to and including about 7.5 mol %, $Li_2O$ in an amount in a range from about 0.5 mol % to about 12 mol %, and $Na_2O$ in an amount in a range from about 6 mol % to about 15 mol %.

In some embodiments, the glass composition of glass layers 12 and/or 20 may include an oxide that imparts a color or tint to the glass articles. In some embodiments, the glass composition of glass layers 12 and/or 20 includes an oxide that prevents discoloration of the glass article when the glass article is exposed to ultraviolet radiation. Examples of such oxides include, without limitation, oxides of: Ti, V, Cr, Mn, Fe, Co, Ni, Cu, Ce, W, and Mo.

Glass layers 12 and/or 20 may have a refractive index in the range from about 1.45 to about 1.55. As used herein, the refractive index values are with respect to a wavelength of 550 nm. Glass layers 12 and/or 20 may be characterized by the manner in which it is formed. For instance, glass layers 12 and/or 20 may be characterized as float-formable (i.e., formed by a float process), down-drawable and, in particular, fusion-formable or slot-drawable (i.e., formed by a down draw process such as a fusion draw process or a slot draw process). In one or more embodiments, glass layers 12 and/or 20 described herein may exhibit an amorphous microstructure and may be substantially free of crystals or crystallites. In other words, in such embodiments, the glass articles exclude glass-ceramic materials.

In one or more embodiments, glass layers 12 and/or 20 exhibits an average total solar transmittance of about 88% or less, over a wavelength range from about 300 nm to about 2500 nm, when glass layers 12 and/or 20 has a thickness of 0.7 mm. For example, glass layers 12 and/or 20 exhibits an average total solar transmittance in a range from about 60% to about 88%, from about 62% to about 88%, from about 64% to about 88%, from about 65% to about 88%, from about 66% to about 88%, from about 68% to about 88%, from about 70% to about 88%, from about 72% to about 88%, from about 60% to about 86%, from about 60% to about 85%, from about 60% to about 84%, from about 60% to about 82%, from about 60% to about 80%, from about 60% to about 78%, from about 60% to about 76%, from about 60% to about 75%, from about 60% to about 74%, or from about 60% to about 72%.

In one or more embodiments, glass layers 12 and/or 20 exhibit an average transmittance in the range from about 75% to about 85%, at a thickness of 0.7 mm or 1 mm, over a wavelength range from about 380 nm to about 780 nm. In some embodiments, the average transmittance at this thickness and over this wavelength range may be in a range from about 75% to about 84%, from about 75% to about 83%, from about 75% to about 82%, from about 75% to about 81%, from about 75% to about 80%, from about 76% to about 85%, from about 77% to about 85%, from about 78% to about 85%, from about 79% to about 85%, or from about 80% to about 85%. In one or more embodiments, glass layers 12 and/or 20 exhibits $T_{uv-380}$ or $T_{uv-400}$ of 50% or less (e.g., 49% or less, 48% or less, 45% or less, 40% or less, 30% or less, 25% or less, 23% or less, 20% or less, or 15% or less), at a thickness of 0.7 mm or 1 mm, over a wavelength range from about 300 nm to about 400 nm.

In one or more embodiments, glass layers 12 and/or 20 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, glass layers 12 and/or 20 may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature below the glass transition point and then rapidly quenching.

In one or more embodiments, glass layers 12 and/or 20 may be chemically strengthened by ion exchange. In the ion exchange process, ions at or near the surface of glass layers 12 and/or 20 are replaced by—or exchanged with—larger ions having the same valence or oxidation state. In those embodiments in which glass layers 12 and/or 20 comprises an alkali aluminosilicate glass, ions in the surface layer of the article and the larger ions are monovalent alkali metal cations, such as $Li^+$, $Na^+$, $Rb^+$, and $Cs^+$. Alternatively, monovalent cations in the surface layer may be replaced with monovalent cations other than alkali metal cations, such as $Ag_+$ or the like. In such embodiments, the monovalent ions (or cations) exchanged into glass layers 12 and/or 20 generate a stress.

Aspect (1) of this disclosure pertains to a method of estimating cold-formability of a complexly curved glass laminate article comprising a first glass sheet and a second glass sheet, the method comprising: obtaining a first geometric parameter (G1) and a second geometric parameter (G2) of a complexly curved first glass sheet of the glass laminate article; calculating a cold-forming estimator (CFE) value related to stress experienced by the first glass sheet during cold-forming, where the CFE value comprises: B1*G1+B2*G2, wherein B1 and B2 are coefficients calculated to relate G1 and G2 to the CFE value; and comparing the calculated CFE value to a cold-forming threshold related to the probability that defects are formed in the complexly curved glass laminate article during cold-forming.

Aspect (2) pertains to the method of Aspect (1), further comprising determining that the curved glass laminate article is suitable for cold-forming, when the calculated CFE value is less than the cold-forming threshold.

Aspect (3) pertains to the method of Aspect (1) or Aspect (2), wherein the first glass sheet has an average thickness that is greater than an average thickness of the second glass sheet, and the first glass sheet is formed from a first glass composition different from a second glass composition of the second glass sheet.

Aspect (4) pertains to the method of Aspect (3), wherein B1, B2 and the cold-forming threshold are functions of the first glass composition.

Aspect (5) pertains to the method of Aspect (3), wherein the first glass composition is soda-lime glass.

Aspect (6) pertains to the method of Aspect (5), wherein the first glass sheet is an unstrengthened glass sheet and the cold-forming threshold is 20 MPa, and further comprising determining that the curved glass laminate article is suitable for cold-forming, when the calculated CFE value is less than the 20 MPa.

Aspect (7) pertains to the method of Aspect (5), wherein the first glass sheet is a thermally strengthened glass sheet and the cold-forming threshold is 50 MPa, and further comprising determining that the curved glass laminate article is suitable for cold-forming, when the calculated CFE value is less than the 50 MPa.

Aspect (8) pertains to the method of any one of Aspects (2) through (7), wherein the second glass composition is an alkali aluminosilicate glass composition or an alkali aluminoborosilicate glass composition.

Aspect (9) pertains to the method of any one of Aspects (2) through (8), further comprising determining B1 and B2 via multiple linear regression analyses of finite element analysis-determined stresses of multiple complexly curved glass laminate articles.

Aspect (10) pertains to the method of any one of Aspects (1) through (9), wherein the cold-forming threshold is a maximum allowable stress for the first glass sheet determined by comparing laminated test samples to stress levels predicted using finite element analysis.

Aspect (11) pertains to the method of any one of Aspects (1) through (10), wherein the first glass sheet comprises a length, L, a width, W, and a chord height, wherein G1=L/W, G2=the chord height, B1=1 and B2=0.5

Aspect (12) pertains to the method of any one of Aspects (1) through (10), wherein the first glass sheet further comprises: an inner surface; an outer surface opposite the inner surface; a width, W; a length, L; an average thickness, T1; wherein the complex curved shape has a chord height, CH, a depth of bend (DOB), a minimum primary radius of curvature, R1, a secondary minimum radius of curvature, R2, and a maximum Gaussian curvature, GC; wherein the second glass layer further comprises: an inner surface; an outer surface; and an average thickness, T2; wherein (0.05673*W−0.1035*L−0.0031*DOB+6.99003*CH+ 0.1855*R1+0.00115*R2+4.633988*GC−0.1836*T1− 101.95*T2) is less than the cold-forming threshold.

Aspect (13) pertains to a method of cold-forming a complexly curved glass laminate article, comprising: supporting a first glass sheet, the first sheet of glass material having a complexly curved shape, a first major surface and a second major surface; supporting a second glass sheet on the first glass sheet, wherein the second glass sheet has a first major surface, a second major surface and a shape that is different from the complexly curved shape; positioning a polymer interlayer material between the second major surface of the first glass sheet and a first major surface of the second glass sheet; bending the second sheet of glass material into conformity with the complexly curved shape of the first sheet of glass material, wherein, during bending, a maximum temperature of the first glass sheet is less than a glass transition temperature of a glass material of the first glass sheet, wherein a maximum temperature of the second glass sheet is less than a glass transition temperature of a glass material of the second glass sheet; wherein the complexly curved shape has a first geometric parameter (G1) and a second geometric parameter (G2), wherein the first principle stress experienced by the first glass sheet during bending is less than or equal to an estimated stress value of (B1*G1+B2*G2), wherein B1 and B2 are coefficients determined to relate G1 and G2 to the stress experienced by the first glass sheet during bending.

Aspect (14) pertains to the method of Aspect (13), wherein the first glass sheet has an average thickness that is greater than an average thickness of the second glass sheet, and the glass material of the first glass sheet is different from the glass material of the second glass sheet.

Aspect (15) pertains to the method of Aspect (13) or Aspect (14), wherein the first glass sheet is an unstrengthened glass sheet and the estimated stress value is less than 20 MPa.

Aspect (16) pertains to the method of Aspect (13) or Aspect (14), wherein the first glass sheet is a thermally strengthened glass sheet and the estimated stress value is 50 MPa.

Aspect (17) pertains to the method of any one of Aspects (13) through (16), wherein the glass material of the second glass sheet is an alkali aluminosilicate glass composition or an alkali aluminoborosilicate glass composition and the glass material of the first glass sheet is a soda-lime composition.

Aspect (18) pertains to a cold-formed glass laminate article comprising: a first glass layer comprising: an inner surface; an outer surface opposite the inner surface; a width, W; a length, L; a complex curved shape having a chord height, CH, wherein $-0.14<L/W-0.05*(CH)<0.223$; and a second glass layer comprising: an inner surface; an outer surface; a polymer interlayer disposed between the inner surface of the first glass layer and inner surface of the second glass layer.

Aspect (19) pertains to the cold-formed glass laminate article of Aspect (18), wherein the first glass layer has an average thickness, T1, that is greater than an average thickness, T2, of the second glass layer.

Aspect (20) pertains to the cold-formed glass laminate article of Aspect (19), wherein T1 is between 1 mm and 4 mm, and T2 is between 0.3 mm and 1 mm.

Aspect (21) pertains to the cold-formed glass laminate article of any one of Aspects (18) through (20), wherein W is between 300 mm and 1800 mm, L is between 230 mm and 1600 mm, and CH is between 1 mm and 45 mm.

Aspect (22) pertains to the cold-formed glass laminate article of any one of Aspects (18) through (21), wherein a glass material of the first glass layer is different from a glass material of the second glass layer.

Aspect (23) pertains to the cold-formed glass laminate article of Aspect (22), wherein the glass material of the second glass layer is an alkali aluminosilicate glass composition or an alkali aluminoborosilicate glass composition and the glass material of the first glass sheet is a soda-lime composition.

Aspect (24) pertains to the cold-formed glass laminate article of any one of Aspects (18) through (23), wherein the second glass layer is a chemically strengthened glass material.

Aspect (25) pertains to a cold-formed glass laminate article comprising: a first glass layer comprising: an inner surface; an outer surface opposite the inner surface; a width, W; a length, L; an average thickness, T1; a complex curved shape having a chord height, CH, a depth of bend (DOB), a minimum primary radius of curvature, R1, a secondary minimum radius of curvature, R2, and a maximum Gaussian curvature, GC; a second glass layer comprising: an inner surface; an outer surface; and an average thickness, T2; and an interlayer disposed between the inner surface of the first glass layer and inner surface of the second glass layer; wherein $(0.05673*W-0.1035*L-0.0031*DOB+6.99003*CH+0.1855*R1+0.00115*R2+4.633988*GC-0.1836*T1-101.95*T2)$ is less than 80 MPa.

Aspect (26) pertains to the cold-formed glass laminate article of Aspect (25), wherein T1 is greater than an T2.

Aspect (27) pertains to the cold-formed glass laminate article of Aspect (25) or Aspect (26), wherein T1 is between 1 mm and 4 mm, and T2 is between 0.3 mm and 1 mm.

Aspect (28) pertains to the cold-formed glass laminate article of any one of Aspects (25) through (27), wherein W is between 300 mm and 1800 mm, L is between 230 mm and 1600 mm, CH is between 1 mm and 45 mm, DOB is between 5 mm and 210 mm, R1 is between 40 mm and 5000 mm, R2 is between 740 mm and 32500 mm, and GC is between $0.14\times10^{-7}$ $1/mm^2$ and $15\times10^{-7}$ $1/mm^2$.

Aspect (29) pertains to the cold-formed glass laminate article of any one of Aspects (25) through (28), wherein a glass material of the first glass layer is different from a glass material of the second glass layer.

Aspect (30) pertains to the cold-formed glass laminate article of Aspect (29), wherein the glass material of the second glass layer is an alkali aluminosilicate glass composition or an alkali aluminoborosilicate glass composition and the glass material of the first glass sheet is a soda-lime composition.

Aspect (31) pertains to the cold-formed glass laminate article of any one of Aspects (25) through (30), wherein the second glass layer is a chemically strengthened glass material.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A cold-formed glass laminate article comprising:
a first glass layer comprising:
an inner surface;
an outer surface opposite the inner surface;
a width, W;
a length, L;
a complex curved shape having a chord height, CH, wherein $-0.14<L/W-0.05$ $mm^{-1}*(CH)<0.223$; and
a second glass layer comprising:
an inner surface;
an outer surface;
a polymer interlayer disposed between the inner surface of the first glass layer and inner surface of the second glass layer, wherein first glass layer is hot-formed to have the complex shape and the second glass layer is cold-formed against the first glass layer at a temperature beneath a softening temperature of the second glass layer to possess the complex curved shape.

2. The cold-formed glass laminate article of claim 1, wherein the first glass layer has an average thickness, T1, that is greater than an average thickness, T2, of the second glass layer.

3. The cold-formed glass laminate article of claim 2, wherein T1 is between 1 mm and 4 mm, and T2 is between 0.3 mm and 1 mm.

4. The cold-formed glass laminate article of claim 1, wherein W is between 300 mm and 1800 mm, L is between 230 mm and 1600 mm, and CH is between 1 mm and 45 mm.

5. The cold-formed glass laminate article of claim 1, wherein a glass material of the first glass layer is different from a glass material of the second glass layer.

6. The cold-formed glass laminate article of claim 5, wherein the glass material of the second glass layer is an alkali aluminosilicate glass composition or an alkali aluminoborosilicate glass composition and the glass material of the first glass sheet is a soda-lime composition.

7. The cold-formed glass laminate article of claim 1, wherein the second glass layer is a chemically strengthened glass material.

8. The cold-formed glass laminate article of claim 1, wherein:
the cold-formed glass laminate article is a windshield,
the chord height is at least 5.0 mm, and
L/W is greater than 0 45.

9. The cold-formed glass laminate article of claim 1, wherein:
the cold-formed glass laminate article is a side window,
the chord height is at least 5.0 mm, and
the first glass sheet has a maximum Gaussian curvature, GC, that is less than or equal to $6.0 \times 10^{-7}$ 1/mm$^2$.

10. The cold-formed glass laminate article of claim 1, wherein:
the cold-formed glass laminate article is a roof,
the chord height is at least 5.0 mm, and
the first glass sheet has a maximum Gaussian curvature, GC, that is less than or equal to $8.0 \times 10^{-7}$ 1/mm$^2$.

11. A cold-formed glass laminate article comprising:
a first glass layer comprising:
an inner surface;
an outer surface opposite the inner surface;
a width, W;
a length, L;
an average thickness, T1;
a complex curved shape having a non-zero chord height, CH, a non-zero depth of bend (DOB), a non-zero minimum primary radius of curvature, R1, a non-zero secondary minimum radius of curvature, R2, and a non-zero maximum Gaussian curvature, GC;
a second glass layer comprising:
an inner surface;
an outer surface; and
an average thickness, T2; and
an interlayer disposed between the inner surface of the first glass layer and inner surface of the second glass layer;
wherein (0.05673 MPa/mm*W−0.1035 MPa/mm*L−0.0031 MPa/mm*DOB+6.99003 MPa/mm*CH+0.01855 MPa/mm*R1+0.00115 MPa/mm*R2+4.633988 MPa*mm$^2$*10$^7$*GC−0.1836 MPa/mm *T1−101.95 MPa/mm*T2) is less than 80 MPa, wherein first glass layer is hot-formed to have the complex shape and the second glass layer is cold-formed against the first glass layer at a temperature beneath a softening temperature of the second glass layer to possess the complex curved shape.

12. The cold-formed glass laminate article of claim 11, wherein T1 is greater than an T2.

13. The cold-formed glass laminate article of claim 11, wherein T1 is between 1 mm and 4 mm, and T2 is between 0.3 mm and 1 mm.

14. The cold-formed glass laminate article of claim 11, wherein, W is between 300 mm and 1800 mm, L is between 230 mm and 1600 mm, CH is between 1 mm and 45 mm, DOB is between 5 mm and 210 mm, R1 is between 40 mm and 5000 mm, R2 is between 740 mm and 32500 mm, and GC is between $0.14 \times 10^{-7}$ 1/mm$^2$ and $15 \times 10^{-7}$ 1/mm$^2$.

15. The cold-formed glass laminate article of claim 11, wherein a glass material of the first glass layer is different from a glass material of the second glass layer.

16. The cold-formed glass laminate article of claim 15, wherein the glass material of the second glass layer is an alkali aluminosilicate glass composition or an alkali aluminoborosilicate glass composition and the glass material of the first glass sheet is a soda-lime composition.

17. The cold-formed glass laminate article of claim 11, wherein the second glass layer is a chemically strengthened glass material.

18. The cold-formed glass laminate article of claim 11, wherein:
the cold-formed glass laminate article is a windshield,
the chord height is at least 5.0 mm, and
L/W is greater than 0 45.

19. The cold-formed glass laminate article of claim 11, wherein:
the cold-formed glass laminate article is a side window,
the chord height is at least 5.0 mm, and
the maximum Gaussian curvature, GC, that is less than or equal to $6.0 \times 10^{-7}$ 1/mm$^2$.

20. The cold-formed glass laminate article of claim 11, wherein:
the cold-formed glass laminate article is a roof,
the chord height is at least 5.0 mm, and
the maximum Gaussian curvature, GC, that is less than or equal to $8.0 \times 10^{-7}$ 1/mm$^2$.

* * * * *

UNITED STATES PATENT AND TRADEMARK OFFICE
CERTIFICATE OF CORRECTION

| | |
|---|---|
| PATENT NO. | : 11,261,119 B2 |
| APPLICATION NO. | : 16/753972 |
| DATED | : March 1, 2022 |
| INVENTOR(S) | : Vikram Bhatia et al. |

It is certified that error appears in the above-identified patent and that said Letters Patent is hereby corrected as shown below:

In the Claims

In Column 19, Line 10, in Claim 8, delete "0 45." and insert -- 0.45. --.

In Column 20, Line 33, in Claim 18, delete "0 45." and insert -- 0.45. --.

Signed and Sealed this
Fifth Day of July, 2022

Katherine Kelly Vidal
*Director of the United States Patent and Trademark Office*